United States Patent [19]
Valentine

[11] 3,806,060
[45] Apr. 23, 1974

[54] FISHING REEL WITH PLANETARY DRIVE
[76] Inventor: Charles C. Valentine, 67 No. Worcester St., Norton, Mass. 02712
[22] Filed: Sept. 15, 1971
[21] Appl. No.: 180,641

[52] U.S. Cl......... 242/84.51 R, 242/84.1 J, 242/215
[51] Int. Cl............................................. A01k 89/02
[58] Field of Search... 242/84.5 R, 84.51 R, 84.1 R, 242/84.1 J, 84.1 L, 84.5 A, 215, 220, 221, 84.51 A, 84.51 P

[56] References Cited
UNITED STATES PATENTS

| | | | |
|---|---|---|---|
| 2,918,227 | 12/1959 | Mauborgne | 242/84.5 A X |
| 2,059,765 | 11/1936 | Adams | 242/84.5 R X |
| R24,153 | 5/1956 | Lockwood | 242/84.1 J X |
| 2,503,366 | 4/1950 | Weckel | 242/220 X |
| 2,984,433 | 5/1961 | Clark | 242/84.5 R X |

Primary Examiner—Billy S. Taylor
Attorney, Agent, or Firm—Dike, Bronstein, Roberts & Cushman

[57] ABSTRACT

A fishing reel comprising a frame, a shaft fixed at one end to the frame, a spool supported on the shaft for rotation thereon, a spindle mounted on the shaft in spaced parallel relation thereto for rotation about its own axis and about the axis of the shaft, a pinion fixed to the spindle in mesh with the gear, and a sleeve on the spindle comprising a handle by means of which the pinion may be moved in a circle about the axis of the shaft to effect rotation of the gear and hence the spool to wind a line onto the spool, said spool being free to be turned by a running line without correspondingly rotating the pinion and handle in a circle about the gear.

7 Claims, 6 Drawing Figures

WIND

UN

FISHING REEL WITH PLANETARY DRIVE

BACKGROUND OF THE INVENTION

The conventional fishing reel has a spool on which the line is wound, a handle and drive means operably connecting the handle to the spool to effect rotation of the spool in a direction to take the line onto the spool and to allow the line to run off the spool when casting and/or when a fish is running with the line. Such reels are either of the construction wherein the handle spins around as the line is unwound either during casting or by a fish running with the line or of the construction wherein there is means in the form of a latch for releasing the handle from the drive to enable the line to unwind without effecting rotation of the handle. This invention has for its purpose to provide a driving connection between the spool and the handle such that rotation of the spool in direction to pay off line does not effect a corresponding rotation of the handle thereby eliminating the nuisance of a rapidly rotating handle which is prone to become caught in the clothing and/or a loop of line.

SUMMARY

A fishing reel comprising a frame to one end of which a shaft is fixed for supporting a spool for rotation thereon and planetary gearing for effecting rotation of the spool comprising a gear fixed to the spool and rotatable thereon about the shaft and a spindle mounted in spaced parallel relation to the shaft for rotation about its axis and about the axis of the shaft, one end of which has on it a pinion which meshes with the gear and the other end of which has on it a sleeve comprising a handle by means of which the pinion may be moved in a circle about the axis of the shaft to effect rotation of the gear and hence the spool to wind a line onto the spool, said spool being free to be turned by a running line without correspondingly rotating the pinion and handle in a circle about the gear.

The invention will now be described in greater detail with reference to the accompanying drawings wherein.

Figure 1:
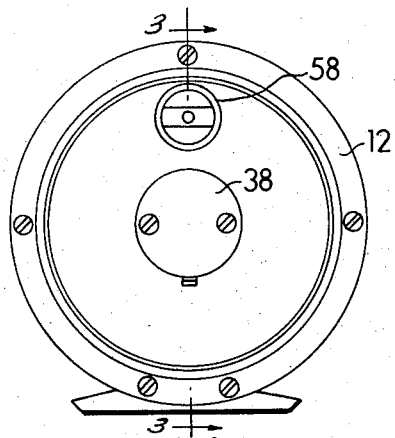
FIG. 1 is an elevation of the fishing reel from the side from which the operating handle projects.
Figure 2:
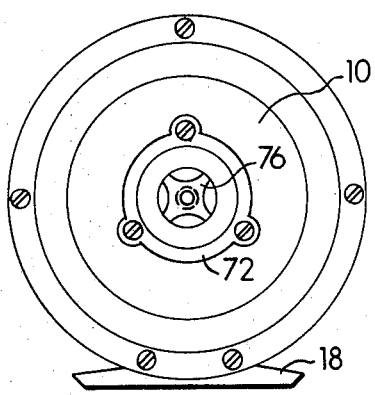
FIG. 2 is an elevation of the fishing reel from the opposite side showing the means for applying a braking action on the spool.
Figure 3:
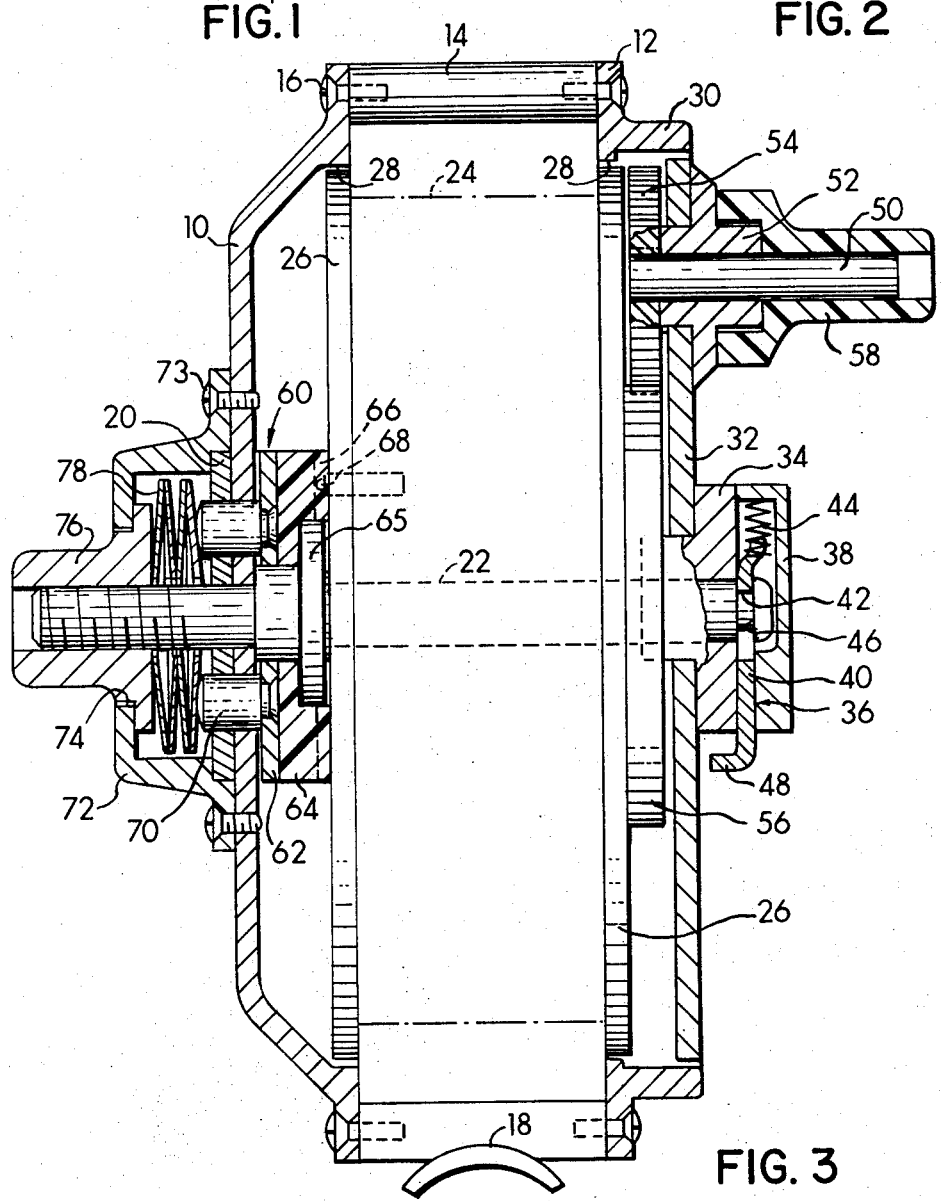
FIG. 3 is an enlarged diametrical section taken on the line 3—'of FIG. 1.
Figure 4:
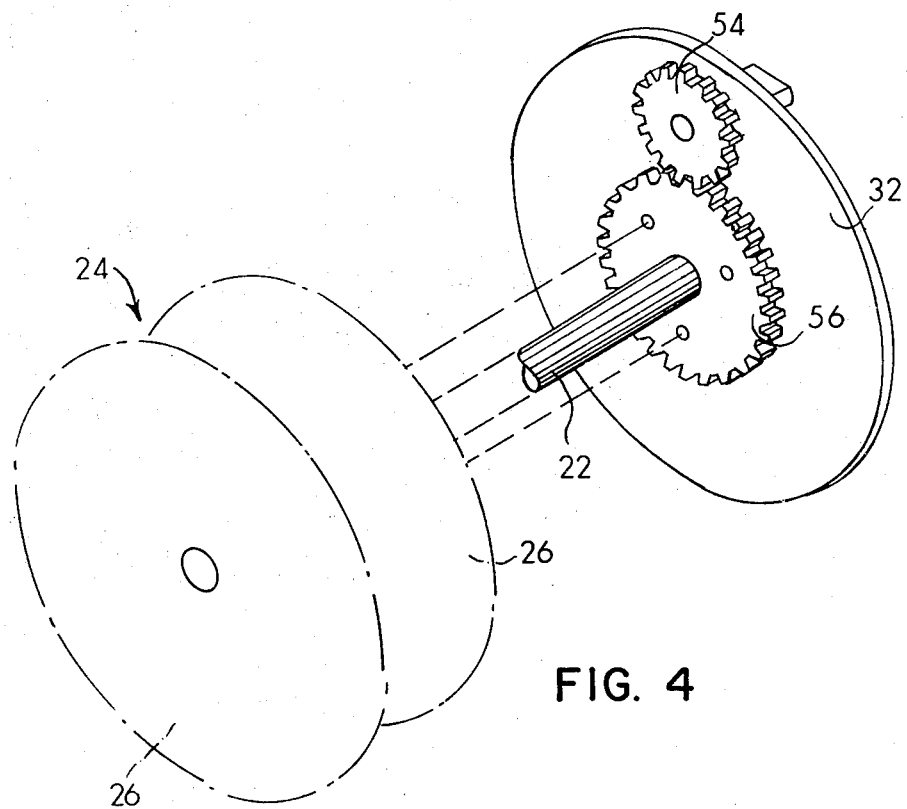
FIG. 4 is a perspective showing the planetary gearing and its connection to the spool which is shown diagrammatically.
Figure 5:
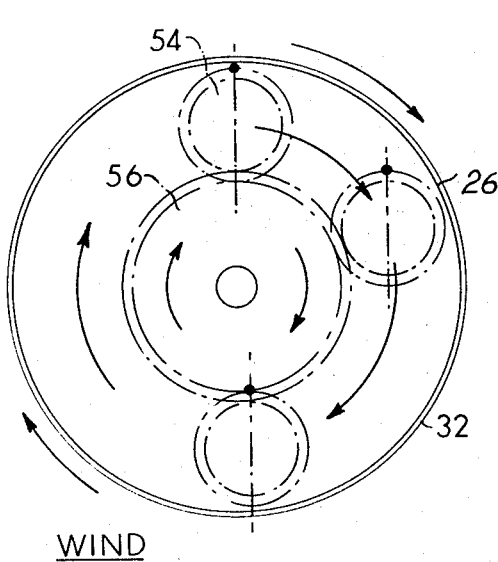
Figure 6:
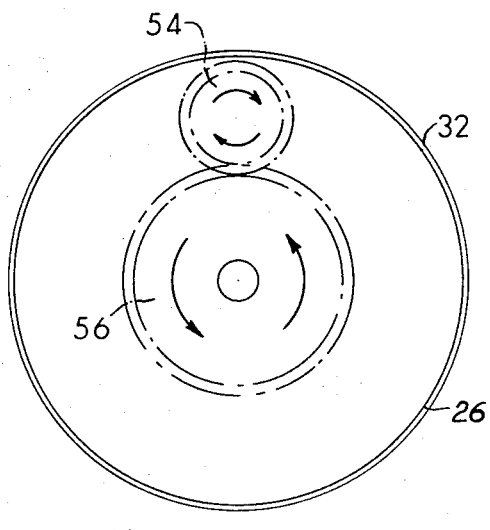

FIG. 5 diagrammatically illustrates the direction of rotation of the several components when winding a line onto the spool; and FIG. 6 shows the relative rotation of several components when the line is being pulled off the spool.

Referring to the drawings, the reel is provided with a frame comprising circular end members 10 and 12 secured to each other in spaced parallel relation by spacing members 14 in the form of cylindrical bars to the ends of which the end members are fastened by screws 16. At the bottom of the frame there is secured a saddle 18 by means of which the reel may be mounted upon a rod. The end member 10 has at its center a bearing plate 20 and this and the end member 10 contain central openings in which is fixed a shaft 22 with a portion extending outwardly therefrom and a portion extending inwardly therefrom through the other end member 12. A spool 24 is mounted on the inwardly extending portion of the shaft 22 to rotate freely thereon, the spool having spaced parallel end flanges 26-26 and the end members having internal annular surfaces 28-28 within which the end flanges of the spool are contained and are free to turn. The end member 12 has an axial outwardly extending annular flange 30 and a disc 32 corresponding substantially in diameter to the inside diameter of the annular flange 30 is mounted on the shaft 22 within the annular flange 30 for rotation about the axis of the shaft. The disc 32 has a bearing block 34 at its center for rotatably receiving the shaft and is secured to the end of the shaft by latch means comprising a latch plate 36 recessed into a cap 38 fastened to the bearing block 34. The latch plate is in the form of a flat blade 40 containing a circular opening 42 of somewhat larger diameter than the shaft biased by means of an internally located compression spring 44 to engage an edge of the opening in the blade in a groove 46 in the end of the shaft. A portion of the latch extends radially from the cap and has a lip 48 by means of which the latch may be disengaged from the groove thereby to release the cap from the end of the shaft and hence the disc so that the latter may be slipped off the end of the shaft.

The spool 24 is rotated by planetary gearing comprising in combination with the disc 32 a spindle 50 rotatably mounted in a bearing member 52 passing through the disc in spaced parallel relation to the axis of the shaft 22 with a portion extending inwardly from the disc 32 and a portion extending outwardly therefrom. A pinion gear 54 is fixed to the inwardly extending portion of the spindle 50 and meshes with a gear 56 which is fastened to the end flange of the spool. A sleeve 58 is fixed to the outwardly extending portion of this spindle 50 and comprises a handle.

As thus constructed movement of the handle 58 in a clockwise direction about the axis of the shaft 22, as shown in FIG. 5, rotates the disc 32 about the axis of the shaft 22, carrying with it the pinion 54 which in turn travels in a circle around the axis of the shaft 22. Movement of the pinion about the axis of the shaft in mesh with the gear rotates the latter and the spool in a direction to wind the line onto the spool.

The reel is of the type wherein, preparatory to casting, the line is pulled off by hand and a feature of this invention is in the provision of the aforesaid planetary gearing which on the one hand enables winding line onto the spool by moving the hand and hence the pinion gear about the axis of the shaft on which the gear 56 is mounted to thus rotate the gear 56 and the spool to wind line on the spool and on the other hand to allow the line to be pulled off the reel preparatory to casting and/or to allow the line to run off the spool when a fish is pulling on the line without causing the pinion gear 54 to travel about the gear 56; hence without having the handle spin rapidly which is not only annoying but may catch on clothing or in a loop of the line with the disasterous result of breaking or badly snarling the line.

FIG. 6 illustrates the relative rotation of the parts when the line is being drawn off the spool, showing the spool 24 moving in a counterclockwise direction, the gear 56 moving in a counterclockwise direction and the pinion 54 moving in a clockwise direction while the disc 26 remains stationary.

The reel also has a brake and ratchet assembly 60 comprising a brake disc 62 and a ratchet plate 64. The brake disc 62 is non-rotatably mounted on the shaft 22 but is slidable axially thereon. The ratchet plate is retained between the brake disc and shoulder 65 which is an integral part of the shaft. The inner side of the ratchet plate 64 has axially facing ratchet teeth 66 and there is a spring pressed plunger 68 mounted in the end of the spool in spaced parallel relation to the axis of the shaft 32 which engages the teeth 66 and permits free rotation of the spool in a clockwise direction while providing adjustable resistance to counterclockwise rotation. A plurality of holes are formed in the bearing plate and the end member 10 at equally spaced distances about the axis of the shaft in which there are mounted pins 70 with their inner ends staked into the brake plate and their outer ends extending from the bearing plate 20. A cap 72 is mounted on the outer side of the end member 10 over the outwardly extending portion of the shaft 22 and the outwardly extending portions of the pins 70 and is fastened to the end member 10 by screws 73. The cap has a central opening 74 in which is rotatably mounted a nut 76 threaded onto the outwardly extending portion of the shaft 32. Spring washers 78 are disposed between the inner side of the nut 76 and the outwardly extending ends of the pins 70 so that by rotating the nut 76 pressure may be applied to the pins to in turn force the brake disc into frictional engagement with the ratchet plate and thus apply braking action to the spool.

The planetary gearing not only affords the advantages referred to above, to wit, allowing the line to run off the spool without spinning the handle but the further advantage of providing a mechanical advantage for maintaining a tight line when playing a large fish. As illustrated herein the gearing provides a 1:1.5 ratio for this purpose.

It should be understood that the present disclosure is for the purpose of illustration only and that this invention includes all modifications and equivalents which fall within the scope of the appended claims.

I claim:

1. A fishing reel comprising two circular end members, means attaching the two end members in spaced parallel relation, a shaft fixed at one end to one of the end members at the center thereof and extending therefrom through the other end member, a spool mounted on the shaft between the end members for rotation about the shaft, said other end member embodying a circular, axially extending flange concentric with the shaft, a disc mounted on the shaft within said flange for rotation about the shaft, a spindle rotatably mounted on the disc in radially spaced relation to the shaft with one end extending inwardly from the disc and the other end extending outwardly therefrom, a pinion fixed to the inwardly extending end of the spindle, a sleeve mounted on the outer end thereof comprising a handle by means of which the pinion may be moved in a circle about the axis of the shaft, and a gear rotatably mounted on the shaft in mesh with the pinion, said gear being fixed to the spool.

2. A fishing reel according to claim 1, wherein the spool has circular end flanges and the end members contain circular openings within which the end flanges of the spool are rotatably received.

3. A fishing reel according to claim 1, comprising a shoulder fixed to the shaft between the one end member and the spool, a brake disc and ratchet plate mounted on the shaft between said one end member and said shoulder, means preventing rotation of the brake disc relative to said one end member while permitting axial movement thereof on said shaft, and means yieldably pressing the brake disc against the ratchet plate and the latter against said shoulder on the shaft.

4. A fishing reel according to claim 3, wherein there is a spring pressed plunger mounted in the end of the spool in spaced parallel relation to the shaft with an end engaged with the ratchet plate.

5. A fishing reel according to claim 4, wherein a ratchet plate has circularly arranged teeth with which the end of a plunger is engaged.

6. A fishing reel according to claim 3, wherein there is a nut threaded on the shaft which is rotatable thereon to adjust the pressure between the brake disc and the ratchet plate.

7. A fishing reel comprising a frame, a shaft fixed at one end to the frame, a spool mounted on the shaft to turn thereon, planetary gearing for effecting rotation of the spool on the shaft comprising a gear mounted on the shaft to turn thereon, said gear being fixed to the spool, a spindle, means mounting the spindle on the shaft in spaced parallel relation to the axis of the shaft for rotation on its own axis and about the axis of the shaft a pinion fixed to the spindle in mesh with the gear and a sleeve rotatably mounted on the spindle, said sleeve comprising a handle by means of which the pinion may be moved in a circle about said gear while permitting the spindle to turn relative to said handle.

* * * * *